(12) United States Patent
Xu et al.

(10) Patent No.: US 9,813,974 B2
(45) Date of Patent: Nov. 7, 2017

(54) INFORMATION REPORTING METHOD, INFORMATION RECEIVING METHOD, UE AND NETWORK DEVICE

(71) Applicant: Huawei Technologies Co., Ltd., Shenzhen (CN)

(72) Inventors: Min Xu, Shanghai (CN); Xiaoying Xu, Shanghai (CN); Xiaoxiao Zheng, Shanghai (CN); Fangfu Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/256,037

(22) Filed: Sep. 2, 2016

(65) Prior Publication Data

US 2016/0381622 A1 Dec. 29, 2016

Related U.S. Application Data

(63) Continuation of application No. PCT/CN2014/072802, filed on Mar. 3, 2014.

(51) Int. Cl.
| | | |
|---|---|---|
| *H04W 36/00* | (2009.01) | |
| *H04W 40/24* | (2009.01) | |
| *H04W 36/30* | (2009.01) | |
| *H04W 72/04* | (2009.01) | |
| *H04W 72/08* | (2009.01) | |
| *H04W 88/02* | (2009.01) | |

(52) U.S. Cl.
CPC ..... *H04W 40/248* (2013.01); *H04W 36/0083* (2013.01); *H04W 36/30* (2013.01); *H04W 72/042* (2013.01); *H04W 72/0453* (2013.01); *H04W 72/085* (2013.01); *H04W 88/02* (2013.01)

(58) Field of Classification Search
USPC ....................................................... 455/437
See application file for complete search history.

(56) References Cited

U.S. PATENT DOCUMENTS

| 6,615,044 B2 | 9/2003 | Tigerstedt et al. |
| 2013/0182657 A1 | 7/2013 | Sun et al. |

FOREIGN PATENT DOCUMENTS

| CN | 1805592 A | 7/2006 |
| CN | 101212764 A | 7/2008 |
| CN | 102300250 A | 12/2011 |

(Continued)

OTHER PUBLICATIONS

"3rd Generation Partnership Project; Technical Specification Group Radio Access Network; Radio Resource Control (RRC); Protocol specification (Release 12)," 3GPP TS 25.331 V12.2.0, Jun. 2014, 2287 pages.

(Continued)

*Primary Examiner* — Joel Ajayi
(74) *Attorney, Agent, or Firm* — Slater Matsil, LLP

(57) ABSTRACT

The present application relates to the field of communications technologies. In embodiments of the present application, the UE may first obtain information about a best cell on a secondary frequency and a list of information about cells whose frequency is the same as the secondary frequency. The UE may measure a cell on the secondary frequency, compare information about the cell with the information about the best cell on the secondary frequency, and determine, according to a comparison result, whether to report the event.

11 Claims, 3 Drawing Sheets

---

A network device sends information about a best cell on a second frequency and a list of information about intra-frequency cells on the second frequency to UE, or a network device sends a list of information about intra-frequency cells on the second frequency to the UE — 701

↓

The network device receives a 1d event of the second frequency that is reported by the UE when a report condition is met, to determine that the best cell on the second frequency changes, where the UE works on a first frequency and the second frequency, and the first frequency is different from the second frequency — 702

(56) References Cited

FOREIGN PATENT DOCUMENTS

EP 2557843 A1 2/2013
EP 2557852 A1 2/2013

OTHER PUBLICATIONS

"3rd Generation Partnership Project; Technical Specification Group Radio Access Network; Radio Resource Control (RRC); Protocol specification (Release 12)," 3GPP TS 25.331, V12.0.0, Dec. 2013, 63 pages.
"Mobility Enhancements for Multi-Carrier Hetnet and Multiflow," Source: Qualcomm Incorporated, Agenda Item: 10.2.4, Document for Discussion and Decision, 3GPP TSG RAN WG2 Meeting #83, R2-1326647, Barcelona, Spain, Aug. 19-23, 2013, 6 pages.

INFORMATION REPORTING METHOD, INFORMATION RECEIVING METHOD, UE AND NETWORK DEVICE

CROSS-REFERENCE TO RELATED APPLICATIONS

This application is a continuation of International Application No. PCT/CN2014/072802, filed on Mar. 3, 2014, which is hereby incorporated by reference in its entirety.

TECHNICAL FIELD

The present application relates to the field of communications technologies, and in particular, to an information reporting method, an information receiving method, UE, and a network device.

BACKGROUND

A capacity of a WCDMA (Wideband Code Division Multiple Access) system is limited by a downlink capacity; in view of this, a technology such as HSDPA (High Speed Downlink Packet Access) is introduced to WCDMA R5 (Wideband Code Division Multiple Access Release 5), thereby implementing high-speed downlink data transmission. However, in an HSDPA environment, a soft handover cannot be performed on UE (user equipment). Therefore, an MF (multiflow transmission) technology is introduced again, that is, in a soft handover area, multiple links may be configured for UE of HSDPA to send data. After an MF-HSDPA feature is applied, downlink throughput performance of the UE in the soft handover area can be improved, and network resource utilization is also improved. For the MF technology, currently, there may be multiple modes according to a quantity of frequencies and a quantity of cells: an SF-DC (single frequency-dual cell) mode, a DF-3C (dual frequency-three cells) mode, a DF-4C (dual frequency-four cells) mode, and the like. When a dual-frequency or multiple-frequency mode such as the DF-3C mode is used, the UE can receive downlink data simultaneously in cells on two or multiple frequencies, but the UE performs uplink feedback in a joint coding manner only on a primary frequency. In addition, a DC-HSDPA (dual-carrier High Speed Downlink Packet Access) feature is also introduced, and the UE can receive downlink data on two frequencies simultaneously if there are two inter-frequency co-coverage cells.

With the development of mobile communications technologies, users have increasingly higher requirements. A small cell is introduced to an existing macro network, so that a quantity of system cells can multiply. If a throughput of each cell remains unchanged, a system capacity may multiply (or even increase tenfold). A Hetnet (heterogeneous network) is formed after a small cell is introduced to a macro cell. A small-cell base station may include a home base station, or referred to as a femtocell, an AP (access point), a Pico (a picocell base station), and a Micro (a micro base station).

The introduction of a small-cell base station may have the following advantages: a coverage range is relatively small; a network device cost (small-scale integration), a network deployment cost (a site may not be needed), and a network transmission cost (an IP network may be used) are reduced; a network operation cost is reduced, where for a Small Cell in the Hetnet, contiguous coverage is not needed, and a small amount of planning and automatic network optimization may be achieved based on a SON (self-organizing network) feature; energy is conserved and radiation is low (transmit power of some Small Cells may be lower than transmit power of UE). The small-cell base station is applicable in a wide range of scenarios, such as a home scenario, an enterprise scenario, or a public place scenario; especially, in the scenarios, such as the enterprises scenario and the public place scenario, in which multiple small-cell base stations are needed for continuous networking, the introduction of the small-cell base station is aimed at enhancing coverage of these scenarios, and can also help the macro cell perform service offloading.

For example, in a networking scenario shown in FIG. 1, a serving HS-DSCH cell (serving high speed downlink shared channel cell) of UE is a Cell 1 on a frequency F1. At a point A, a configuration of the UE is DC-HSDPA. When the UE moves from the point A to a point B (a dashed line with an arrow in FIG. 1 indicates a direction of movement of the UE), a Cell 3 interferes with a Cell 2, where the Cell 3 and the Cell 2 are both on a frequency F2, causing that a link of the Cell 2 becomes worse, thereby affecting a throughput of the UE and user experience; at this time, the Cell 3 should be configured for the UE to perform a multiflow transmission operation.

In the scenario shown in FIG. 1, 1x events, such as a 1a event, a 1b event, a 1c event, and a 1d event, for measurement of a cell need to be reported. The 1x events are mainly used to maintain intra-frequency cell measurement and event reporting, mainly aimed at reporting for a cell; for example, the 1d event indicates that a current best cell changes. To report a 1x event, one best cell (best cell) needs to be initialized first, where the cell is a cell having the best measurement signal in an active set, and information about the best cell is stored in a 1d event variable BEST_CELL_1D_EVENT (which is also indicated by TRIGGERED_1D_EVENT sometimes) of the UE; a subsequently measured cell is compared with the cell; if the subsequently measured cell is better than the cell, the UE is triggered to report a 1d event, and a handover between downlink serving cells is triggered on a network side according to the 1d event reported by the UE. A 2x event is mainly aimed at inter-frequency measurement, used to estimate signal quality of all measured cells on a frequency, and is mainly applied to the frequency. For the scenario in FIG. 1, obviously, the UE needs to report a 1x event, especially, a 1d event to enable a network to find the cell 3 and to perform a subsequent operation, such as an operation of changing the serving HS-DSCH cell of the UE to the cell 3, configuring the UE to perform a DF-3C operation, or configuring an SF-DC operation on the frequency F2.

Currently, a DC-HSUPA (dual-carrier High Speed Downlink Packet Access) feature has been introduced, and the UE may send uplink data in two inter-frequency cells. This feature already supports a case in which the UE can use a cell on a secondary (second) frequency as an intra-frequency cell to perform intra-frequency measurement and report 1x events, such as a 1a event, a 1b event, and a 1c event; however, this feature does not support reporting of a 1d event. This is because cells on a primary frequency and a secondary frequency appear in pairs, a 1d event on the secondary frequency is not needed for triggering a handover between downlink serving cells, and only a 1d event on the primary frequency is needed. However, macro and small cells in a Hetnet scenario are not co-coverage cells, that is, the macro and small cells do not appear in pairs, and therefore reporting of a 1d event needs to be supported. If a 1x event needs to be reported, an active set needs to be maintained, which requires all cells in the active set to be related to a soft handover, that is, uplink and downlink links need to be configured for all related cells in a UE active set; if a DC-HSUPA operation meets this condition, the UE simultaneously establishes uplink and downlink links in cells on the secondary frequency. When only an HSDPA-related operation, such as a DC-HSDPA operation, a DF-3C (dual frequency-three cells) operation, or a DF-4C (dual frequency-four cells) operation, is configured, and only a channel related to downlink data transmission, such as an HS-SCCH (high speed shared control channel) or an HS-PDSCH (high speed physical downlink shared channel), is configured on the secondary (second) frequency (such as the frequency F2 in FIG. 1), but a channel such as a DPCH (dedicated physical channel) is not configured, these cells are inconsistent with a definition of an active set, and uplink and downlink data cannot be transmitted simultaneously.

That is, in the scenario shown in FIG. 1, on the secondary frequency, there is only downlink data and only one serving cell of serving HS-DSCH cell, an active set cannot be maintained, and the UE cannot initialize information about one best cell and therefore cannot subsequently compare information about another cell with the information about the best cell; as a result, the UE cannot report, on the secondary frequency, a $1d$ event for a cell.

SUMMARY

Embodiments of the present invention provide an information reporting method, an information receiving method, UE, and a network device, which are used to solve a technical problem in the prior art that in an HSDPA environment, UE cannot report, on a secondary frequency, a $1d$ event and other $1x$ events for a cell.

According to a first aspect of the present invention, an information reporting method is provided. A user equipment (UE) obtains information about a best cell on a secondary frequency and a list of information about cells whose frequency is the same as the secondary frequency. The UE works on a first frequency and the secondary frequency, and the first frequency is different from the secondary frequency. If a report condition is met the UE reports a $1d$ event of the secondary frequency to a network device, to notify the network device that the best cell on the secondary frequency changes.

In some embodiments, the obtaining, by UE, information about a best cell on a secondary frequency and a list of information about cells whose frequency is the same as the secondary frequency includes obtaining, by the UE, the information about the best cell on the secondary frequency and the list of the information about the cells whose frequency is the same as the secondary frequency that are sent by the network device.

In some embodiments, the obtaining, by the UE, the information about the best cell on the secondary frequency and the list of the information about the cells whose frequency is the same as the secondary frequency includes: receiving, by the UE, a measurement control message Measurement Control, or a Radio Resource Control protocol connection setup message RRC Connection Setup, or a physical channel reconfiguration message PHYSICAL CHANNEL RECONFIGURATION, or a radio bearer reconfiguration message RADIO BEARER RECONFIGURATION, or a radio bearer setup message RADIO BEARER SETUP that carries the information about the best cell on the secondary frequency and the list of the information about the cells whose frequency is the same as the secondary frequency and is sent by the network device, and obtaining the information about the best cell on the secondary frequency and the list of the information about the cells whose frequency is the same as the secondary frequency.

In some embodiments, the obtaining, by UE, information about a best cell on a secondary frequency and a list of information about cells whose frequency is the same as the secondary frequency includes: setting, by the UE, a cell on the secondary frequency as the best cell on the secondary frequency, and obtaining the information about the best cell on the secondary frequency; and obtaining, by the UE, the list of the information about the cells whose frequency is the same as the secondary frequency that is sent by the network device.

In some embodiments, the obtaining, by the UE, the list of the information about the cells whose frequency is the same as the secondary frequency that is sent by the network device includes: receiving, by the UE, Measurement Control, or RRC Connection Setup, or PHYSICAL CHANNEL RECONFIGURATION, or RADIO BEARER RECONFIGURATION, or RADIO BEARER SETUP that carries the list of the information about the cells whose frequency is the same as the secondary frequency and is sent by the network device, and obtaining the list of the information about the cells whose frequency is the same as the secondary frequency.

In some embodiments, the UE sets a cell on the secondary frequency as the best cell on the secondary frequency. If there is a serving high speed downlink shared channel cell secondary serving HS-DSCH cell that is configured for the UE, on the secondary frequency, the UE sets the secondary serving HS-DSCH cell as the best cell. If there is no secondary serving HS-DSCH cell that is configured for the UE, but an assisting secondary serving high speed downlink shared channel cell assisting secondary serving HS-DSCH cell, which is configured for the UE, on the secondary frequency, the UE sets the assisting secondary serving HS-DSCH cell as the best cell.

In some embodiments, the setting, by the UE, a cell on the secondary frequency as the best cell on the secondary frequency includes: if the UE has an active set, initializing a best cell in the active set to the best cell; and if the UE has no active set, initializing a best cell in a list of information about inter-frequency cells on the secondary frequency or the list of the information about the cells whose frequency is the same as the secondary frequency to the best cell.

In some embodiments, the list of the information about the cells whose frequency is the same as the secondary frequency is a list of information about intra-frequency cells on the secondary frequency, or a list of information about $1d$ event of intra-frequency cells on the secondary frequency.

In some embodiments, before the obtaining, by UE, information about a best cell on a secondary frequency and a list of information about cells whose frequency is the same as the secondary frequency, the method further includes: reporting, by the UE to the network device, information about a capability of supporting measurement and reporting of the $1d$ event of the secondary frequency.

According to a second aspect of the present invention, an information receiving method is provided. A network device sends information about a best cell on a secondary frequency and a list of information about cells whose frequency is the same as the secondary frequency to UE, or sends the list of the information about the cells whose frequency is the same as the secondary frequency to the UE. The network device receives a $1d$ event of the secondary frequency that is reported by the UE when a report condition is met, to determine that the best cell on the secondary frequency changes, where the UE works on a first frequency and the secondary frequency, and the first frequency is different from the secondary frequency.

In some embodiments, in a first possible implementation manner, before the sending, by a network device, information about a best cell on a secondary frequency and a list of information about cells whose frequency is the same as the secondary frequency to UE, or sending, by the network device, the list of the information about the cells whose frequency is the same as the secondary frequency to the UE, the method further includes: receiving, by the network device, information that is about a capability of supporting measurement and reporting of the 1$d$ event of the secondary frequency and sent by the UE.

In some embodiments, the sending, by a network device, information about a best cell on a secondary frequency and a list of information about cells whose frequency is the same as the secondary frequency to UE, or sending, by the network device, the list of the information about the cells whose frequency is the same as the secondary frequency to the UE includes: sending, by the network device, the information about the best cell on the secondary frequency and the list of the information about the cells whose frequency is the same as the secondary frequency, or the list of the information about the cells whose frequency is the same as the secondary frequency to the UE by using Measurement Control, or RRC Connection Setup, or PHYSICAL CHANNEL RECONFIGURATION, or RADIO BEARER RECONFIGURATION, or RADIO BEARER SETUP.

In some embodiments, the list of the information about the cells whose frequency is the same as the secondary frequency is a list of information about intra-frequency cells on the secondary frequency, or a list of information about 1$d$ event of intra-frequency cells on the secondary frequency.

According to a third aspect of the present invention, UE includes a plurality of modules. An acquiring module is configured to obtain information about a best cell on a secondary frequency and a list of information about cells whose frequency is the same as the secondary frequency. The UE at least works on a first frequency and the secondary frequency, and the first frequency is different from the secondary frequency. A reporting module is configured to report a 1$d$ event of the secondary frequency to a network device if a report condition is met, to notify the network device that the best cell on the secondary frequency changes.

In some embodiments, in a first possible implementation manner, the acquiring module is specifically configured to obtain the information about the best cell on the secondary frequency and the list of the information about the cells whose frequency is the same as the secondary frequency that are sent by the network device.

In some embodiments, the acquiring module is specifically configured to receive Measurement Control, or RRC Connection Setup, or PHYSICAL CHANNEL RECONFIGURATION, or RADIO BEARER RECONFIGURATION, or RADIO BEARER SETUP that carries the information about the best cell on the secondary frequency and the list of the information about the cells whose frequency is the same as the secondary frequency and is sent by the network device, and obtain the information about the best cell on the secondary frequency and the list of the information about the cells whose frequency is the same as the secondary frequency.

In some embodiments, the acquiring module is specifically configured to set a cell on the secondary frequency as the best cell on the secondary frequency, and obtain the information about the best cell on the secondary frequency of the best cell on the secondary frequency; and obtain the list of the information about the cells whose frequency is the same as the secondary frequency that is sent by the network device.

In some embodiments, the acquiring module is specifically configured to obtain the list of the information about the cells whose frequency is the same as the secondary frequency that is sent by the network device is specifically: receiving Measurement Control, or RRC Connection Setup, or PHYSICAL CHANNEL RECONFIGURATION, or RADIO BEARER RECONFIGURATION, or RADIO BEARER SETUP that carries the list of the information about the cells whose frequency is the same as the secondary frequency and is sent by the network device, and obtaining the list of the information about the cells whose frequency is the same as the secondary frequency.

In some embodiments, the acquiring module is specifically configured to set a cell on the secondary frequency as the best cell on the secondary frequency is specifically: if there is a secondary serving HS-DSCH cell, which is configured for the UE, on the secondary frequency, setting the secondary serving HS-DSCH cell as the best cell on the secondary frequency; or if there is no secondary serving HS-DSCH cell, which is configured for the UE, but an assisting secondary serving HS-DSCH cell, which is configured for the UE, on the secondary frequency, setting the assisting secondary serving HS-DSCH cell as the best cell on the secondary frequency.

In some embodiments, the acquiring module is specifically configured to set a cell on the secondary frequency as the best cell on the secondary frequency is specifically: if the UE has an active set, initializing a best cell in the active set to the best cell; and if the UE has no active set, initializing a best cell in a list of information about inter-frequency cells on the secondary frequency or the list of the information about the cells whose frequency is the same as the secondary frequency to the best cell.

With reference to the third aspect or any possible implementation manner of the first possible implementation manner to the sixth possible implementation manner, in a seventh possible implementation manner, the list of the information about the cells whose frequency is the same as the secondary frequency is a list of information about intra-frequency cells on the secondary frequency, or a list of information about 1$d$ event of intra-frequency cells on the secondary frequency.

With reference to the third aspect or any possible implementation manner of the first possible implementation manner to the seventh possible implementation manner, in an eighth possible implementation manner, the reporting module is further configured to report, to the network device, information about a capability of supporting measurement and reporting of the 1$d$ event of the secondary frequency.

According to a fourth aspect of the present invention, a network device includes a number of modules. A sending module is configured to send information about a best cell on a secondary frequency and a list of information about cells whose frequency is the same as the secondary frequency to UE or to send the list of the information about the cells whose frequency is the same as the secondary frequency to the UE. A receiving module is configured to receive a 1$d$ event of the secondary frequency that is reported by the UE when a report condition is met, to determine that the best cell on the secondary frequency changes. The UE works on a first frequency and the secondary frequency, and the first frequency is different from the secondary frequency.

In some embodiments, the network device further includes a receiving module, configured to receive information that is about a capability of supporting measurement and reporting of the 1d event of the secondary frequency and sent by the UE.

In some embodiments, the sending module is specifically configured to send the information about the best cell on the secondary frequency and the list of the information about the cells whose frequency is the same as the secondary frequency, or the list of the information about the cells whose frequency is the same as the secondary frequency to the UE by using Measurement Control, or RRC Connection Setup, or PHYSICAL CHANNEL RECONFIGURATION, or RADIO BEARER RECONFIGURATION, or RADIO BEARER SETUP.

In some embodiments, the list of the information about the cells whose frequency is the same as the secondary frequency is a list of information about intra-frequency cells on the secondary frequency, or a list of information about 1d event of intra-frequency cells on the secondary frequency.

According to a fifth aspect of the present invention, UE includes a processor and a transmitter. The processor is configured to obtain information about a best cell on a secondary frequency and a list of information about cells whose frequency is the same as the secondary frequency. The UE at least works on a first frequency and the secondary frequency, and the first frequency is different from the secondary frequency. The transmitter is configured to if a report condition is met, report a 1d event of the secondary frequency to a network device, to notify the network device that the best cell on the secondary frequency changes.

In some embodiments, in a first possible implementation manner, the UE further includes a receiver; and the processor is specifically configured to obtain, by using the receiver, the information about the best cell on the secondary frequency and the list of the information about the cells whose frequency is the same as the secondary frequency that are sent by the network device.

In some embodiments, in a second possible implementation manner, the processor is specifically configured to receive, by using the receiver, Measurement Control, or RRC Connection Setup, or PHYSICAL CHANNEL RECONFIGURATION, or RADIO BEARER RECONFIGURATION, or RADIO BEARER SETUP that carries the information about the best cell on the secondary frequency and the list of the information about the cells whose frequency is the same as the secondary frequency and is sent by the network device, and obtain the information about the best cell on the secondary frequency and the list of the information about the cells whose frequency is the same as the secondary frequency.

In some embodiments, the UE further includes a receiver; and the processor is specifically configured to set a cell on the secondary frequency as the best cell on the secondary frequency, and obtain the information about the best cell on the secondary frequency of the best cell on the secondary frequency; and obtain, by using the receiver, the list of the information about the cells whose frequency is the same as the secondary frequency that is sent by the network device.

In some embodiments, the processor is specifically configured to receive, by using the receiver, Measurement Control, or RRC Connection Setup, or PHYSICAL CHANNEL RECONFIGURATION, or RADIO BEARER RECONFIGURATION, or RADIO BEARER SETUP that carries the list of the information about the cells whose frequency is the same as the secondary frequency and is sent by the network device, and obtain the list of the information about the cells whose frequency is the same as the secondary frequency.

In some embodiments, the processor is specifically configured to set a cell on the secondary frequency as the best cell on the secondary frequency is specifically: if there is a secondary serving HS-DSCH cell, which is configured for the UE, on the secondary frequency, setting the secondary serving HS-DSCH cell as the best cell on the secondary frequency; or if there is no secondary serving HS-DSCH cell, which is configured for the UE, but an assisting secondary serving HS-DSCH cell, which is configured for the UE, on the secondary frequency, setting the assisting secondary serving HS-DSCH cell as the best cell on the secondary frequency.

In some embodiments, the processor is specifically configured to set a cell on the secondary frequency as the best cell on the secondary frequency is specifically: if the UE has an active set, initializing a best cell in the active set to the best cell; and if the UE has no active set, initializing a best cell in a list of information about inter-frequency cells on the secondary frequency or the list of the information about the cells whose frequency is the same as the secondary frequency to the best cell.

In some embodiments, the list of the information about the cells whose frequency is the same as the secondary frequency is a list of information about intra-frequency cells on the secondary frequency, or a list of information about 1d event of intra-frequency cells on the secondary frequency.

In some embodiments, the transmitter is further configured to report, to the network device, information about a capability of supporting measurement and reporting of the 1d event of the secondary frequency.

According to a sixth aspect of the present invention, a network device includes a transmitter and a receiver. The transmitter is configured to send information about a best cell on a secondary frequency and a list of information about cells whose frequency is the same as the secondary frequency to UE, or to send the list of the information about the cells whose frequency is the same as the secondary frequency to the UE. The receiver is configured to receive a 1d event of the secondary frequency that is reported by the UE when a report condition is met, to determine that the best cell on the secondary frequency changes. The UE works on a first frequency and the secondary frequency, and the first frequency is different from the secondary frequency.

In some embodiments, the receiver is further configured to receive information that is about a capability of supporting measurement and reporting of the 1d event of the secondary frequency and sent by the UE.

In some embodiments, the transmitter is specifically configured to send the information about the best cell on the secondary frequency and the list of the information about the cells whose frequency is the same as the secondary frequency, or the list of the information about the cells whose frequency is the same as the secondary frequency to the UE by using Measurement Control, or RRC Connection Setup, or PHYSICAL CHANNEL RECONFIGURATION, or RADIO BEARER RECONFIGURATION, or RADIO BEARER SETUP.

In some embodiments, the list of the information about the cells whose frequency is the same as the secondary frequency is a list of information about intra-frequency cells on the secondary frequency, or a list of information about 1d event of intra-frequency cells on the secondary frequency.

In the embodiments of the present invention, UE may obtain information about a best cell on a secondary frequency and a list of information about cells whose frequency is the same as the secondary frequency, and therefore the UE may measure all cells on the secondary frequency according to the list of the information about the cells whose frequency is the same as the secondary frequency, and may compare information about other cells with the information about the best cell; if a report condition is met, the UE may report a 1d event of the secondary frequency, and notify a network device that the best cell on the secondary frequency changes, so that the network device may perform, according to the 1d event reported by the UE, a subsequent operation, such as an operation of changing a serving HS-DSCH cell of the UE to a cell 3, configuring the UE to perform a DF-3C operation, or configuring a SF-DC operation on a frequency F2; in addition, the UE may also report another 1x event of the secondary frequency, thereby effectively solving a problem in the prior art.

DETAILED DESCRIPTION OF ILLUSTRATIVE EMBODIMENTS

Figure 1:
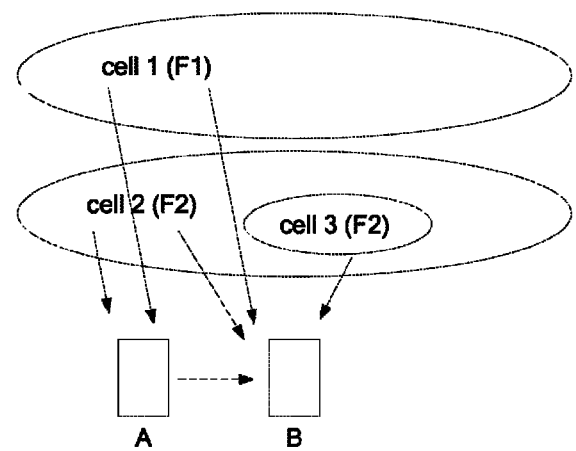
FIG. 1 is a schematic diagram of a networking scenario in the prior art.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access system, a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other communications systems.

All aspects are described herein with reference to user equipment and/or a network device.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, an access point, a remote terminal, an access terminal, a user terminal, a user agent, a user device, or user equipment.

The network device may be, for example, a base station, or may be an RNC (radio network controller), or may be a relay device, or may be another network device. The base station (for example, an access point) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS) in GSM or the CDMA, may also be a base station (NodeB) in WCDMA, and may further be an evolved NodeB (eNB, or e-NodeB) in the LTE, which is not limited in the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The embodiments of the present invention are further described below in detail with reference to the accompanying drawings of the specification.

An embodiment of the present invention provides an information reporting method. The method includes obtaining, by UE, information about a best cell on a secondary frequency and a list of information about cells whose frequency is the same as the secondary frequency, where the UE at least works on a first frequency and the secondary frequency; and if a report condition is met, reporting, by the UE, a 1d event of the secondary frequency to a network device, to notify the network device that the best cell on the secondary frequency changes. The network device described herein may be a base station, or may also be an RNC, or may also be a relay device, or may also be another network device.

In this embodiment of the present invention, UE may obtain information about a best cell on a secondary frequency and a list of information about cells whose frequency is the same as the secondary frequency, and therefore the UE may measure all cells on the secondary frequency according to the list of the information about the cells whose frequency is the same as the secondary frequency, and may compare information about other cells with the information about the best cell; if a report condition is met, the UE may report a 1$d$ event of the secondary frequency, and notify a network device that the best cell on the secondary frequency changes, so that the network device may perform, according to the 1$d$ event reported by the UE, a subsequent operation, such as an operation of changing a serving HS-DSCH cell of the UE to a cell 3, an operation of configuring the UE to perform a DF-3C operation, or configuring an SF-DC operation on a frequency F2; in addition, the UE may also report another 1$x$ event of the secondary frequency, thereby effectively solving a problem in the prior art.

Figure 2:
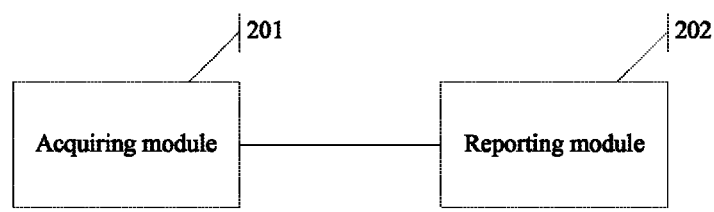
FIG. 2 is a main structural block diagram of UE according to an embodiment of the present invention.

Referring to FIG. 2, an embodiment of the present invention provides UE. The UE may include an acquiring module 201 and a reporting module 202.

The acquiring module 201 may be configured to obtain information about a best cell on a secondary frequency and a list of information about cells whose frequency is the same as the secondary frequency, where the UE at least works on a first frequency and the secondary frequency, and the first frequency is different from the secondary frequency.

The reporting module 202 may be configured to: if a report condition is met, report a 1$d$ event of the secondary frequency to a network device, to notify the network device that the best cell on the secondary frequency changes.

In this embodiment of the present invention, the first frequency is different from the secondary frequency, and the first frequency may be adjacent or may not be adjacent to the secondary frequency. That the UE at least works on a first frequency and the secondary frequency means that the UE receives downlink data at least on the first frequency and the secondary frequency and a network environment at this time is DC-HSDPA, and/or means that the UE performs uplink data transmission at least on the first frequency and the secondary frequency and a network environment at this time is DC-HSUPA (dual-carrier High Speed Uplink Packet Access); the UE may initialize and maintain a UE active set on the secondary frequency; for the 1$d$ event, a best cell in the active set may be set as a best cell of a 1$d$ event variable of the UE, and the best cell is stored.

Optionally, in this embodiment of the present invention, the first frequency may be a primary frequency or a Primary uplink frequency that is configured for the UE, and the secondary frequency may be a secondary frequency (second frequency) or a secondary uplink frequency (second uplink frequency) that is configured for the UE.

Optionally, in this embodiment of the present invention, the UE may work at least on the first frequency and the secondary frequency, or the UE may work in an environment of multiple frequencies. For example, if the UE works in an environment that includes at least three frequencies, the first frequency is the primary frequency, any other frequency except the primary frequency is a non-primary frequency, and each non-primary frequency may be referred to as the secondary frequency. At this time, the UE obtains information about a best cell on the non-primary frequency and a list of information about cells whose frequency is the same as the non-primary frequency.

Optionally, in this embodiment of the present invention, the acquiring module 201 may specifically be configured to obtain the information about the best cell on the secondary frequency and the list of the information about the cells whose frequency is the same as the secondary frequency that are sent by the network device.

There may be multiple cells on the secondary frequency, one of which is set as the best cell, and the information about the best cell is the information about the best cell on the secondary frequency. The best cell is a cell having the best signal quality on the secondary frequency or a cell having the least path loss on the secondary frequency.

The list of the information about the cells whose frequency is the same as the secondary frequency includes information about all cells on the secondary frequency, but may not include the information about the best cell on the secondary frequency.

Optionally, in this embodiment of the present invention, the acquiring module 201 may specifically be configured to receive Measurement Control (a measurement control message), or RRC Connection Setup (a Radio Resource Control protocol connection setup message), or PHYSICAL CHANNEL RECONFIGURATION (a physical channel reconfiguration message), or RADIO BEARER RECONFIGURATION (a radio bearer reconfiguration message), or RADIO BEARER SETUP (a radio bearer setup message) that carries the information about the best cell on the secondary frequency and the list of the information about the cells whose frequency is the same as the secondary frequency and is sent by the network device, and obtain the information about the best cell on the secondary frequency and the list of the information about the cells whose frequency is the same as the secondary frequency.

That is, in this embodiment, the network device sets a cell on the secondary frequency as the best cell on the secondary frequency, where information about the cell is the information about the best cell on the secondary frequency; the network device may further add the information about the cells on the secondary frequency to the list of the information about the cells whose frequency is the same as the secondary frequency. The network device may send both the information about the best cell on the secondary frequency and the list of the information about the cells whose frequency is the same as the secondary frequency to the UE. The UE generates a 1$d$ event variable of the UE according to the received information about the best cell on the secondary frequency, and initializes a corresponding cell in the received information about the best cell on the secondary frequency to a best cell of the 1$d$ event variable of the UE.

Optionally, the network device may further send an intra-frequency measurement and reporting rule of the secondary frequency to the UE, and the UE receives the rule by using the acquiring module 201, so that the UE measures the cells whose frequency is the same as the secondary frequency and reports the 1$d$ event according to the intra-frequency measurement and reporting rule of the secondary frequency and the list of the information about the cells whose frequency is the same as the secondary frequency. Optionally, the network device may send the list of the information about the cells whose frequency is the same as the secondary frequency, the information about the best cell on the secondary frequency, and the intra-frequency measurement and reporting rule of the secondary frequency to the UE by using one message; in this way, the UE can receive the information together, thereby reducing a quantity of messages, and saving transmission resources.

Optionally, in this embodiment of the present invention, the acquiring module 201 may specifically be configured to set a cell on the secondary frequency as the best cell on the secondary frequency, and obtain the information about the best cell on the secondary frequency of the best cell on the secondary frequency; and obtain the list of the information about the cells whose frequency is the same as the secondary frequency that is sent by the network device.

Optionally, in this embodiment of the present invention, that the acquiring module 201 may specifically be configured to obtain the list of the information about the cells whose frequency is the same as the secondary frequency that is sent by the network device is specifically: receiving Measurement Control, or RRC Connection Setup, or PHYSICAL CHANNEL RECONFIGURATION, or RADIO BEARER RECONFIGURATION, or RADIO BEARER SETUP that carries the list of the information about the cells whose frequency is the same as the secondary frequency and is sent by the network device, and obtaining the list of the information about the cells whose frequency is the same as the secondary frequency. That is, the network device may send the list of the information about the cells whose frequency is the same as the secondary frequency to the UE by using different messages.

That is, in this embodiment, the UE sets a cell on the secondary frequency as the best cell on the secondary frequency, where information about the cell is the information about the best cell on the secondary frequency; the network device may add the information about the cells on the secondary frequency to the list of the information about the cells whose frequency is the same as the secondary frequency. The network device may send the list of the information about the cells whose frequency is the same as the secondary frequency to the UE.

Optionally, the network device may further send an intra-frequency measurement and reporting rule of the secondary frequency to the UE, and the UE receives the rule by using the acquiring module 201, so that the UE measures the cells whose frequency is the same as the secondary frequency and reports the 1d event according to the intra-frequency measurement and reporting rule of the secondary frequency and the list of the information about the cells whose frequency is the same as the secondary frequency. Optionally, the network device may send the list of the information about the cells whose frequency is the same as the secondary frequency, and the intra-frequency measurement and reporting rule of the secondary frequency to the UE by using one message; in this way, the UE can receive the information together, thereby reducing a quantity of messages, and saving transmission resources.

Optionally, in this embodiment of the present invention, that the acquiring module 201 may specifically be configured to set a cell on the secondary frequency as the best cell on the secondary frequency is specifically: 1. if there is a secondary serving HS-DSCH cell (a secondary serving high speed downlink shared channel cell), which is configured for the UE, on the secondary frequency, setting the secondary serving HS-DSCH cell as the best cell on the secondary frequency; or 2. if there is no secondary serving HS-DSCH cell, which is configured for the UE, but an assisting secondary serving HS-DSCH cell (an assisting secondary serving high speed downlink shared channel cell), which is configured for the UE, on the secondary frequency, setting the assisting secondary serving HS-DSCH cell as the best cell on the secondary frequency; or 3. performing, by the UE, measurement according to an obtained list of the information about the cells whose frequency is the same as the secondary frequency, and setting a detected best cell as the best cell on the secondary frequency; or 4. performing, by the UE, measurement according to an obtained list of information about inter-frequency cells on the secondary frequency, setting a detected best cell as the best cell on the secondary frequency; and generating the 1d event variable of the UE, and initializing a determined best cell on the secondary frequency to the best cell of the 1d event variable of the UE. For conditions 1 and 2, after the best cell on the secondary frequency is set, the 1d event is reported only when a 1d event triggering condition is met; however, for conditions 3 and 4, if a corresponding list of information about cells includes information about more than one cell, after setting the best cell on the secondary frequency, the UE immediately triggers the reporting of the 1d event, so as to ensure that the network device obtains information about the best cell initialized by the UE.

Optionally, in this embodiment of the present invention, that the acquiring module 201 may specifically be configured to set a cell on the secondary frequency as the best cell on the secondary frequency is specifically: if the UE has an active set, initializing a best cell in the active set to the best cell; and if the UE has no active set, initializing a best cell in a list of information about inter-frequency cells on the secondary frequency or a the list of the information about the cells whose frequency is the same as the secondary frequency to the best cell.

Optionally, in this embodiment of the present invention, the list of the information about the cells whose frequency is the same as the secondary frequency is a list of information about intra-frequency cells on the secondary frequency, or a list of information about 1d event of intra-frequency cells on the secondary frequency.

Optionally, the list of information about intra-frequency cells on the secondary frequency may specifically refer to an existing IE (information element): Intra-frequency cell info list on secondary UL frequency in a message, and this is an existing list of information about cells whose frequency is the same as the secondary frequency in the network device. The network device may add the information about the cells on the secondary frequency to the list, and send the list to the UE.

Optionally, the list of the information about the cells whose frequency is the same as the secondary frequency may specifically refer to the list of information about 1d event of intra-frequency cells on the secondary frequency, which is a list that is generated by the network device according to the information about the cells on the secondary frequency, may be an IE that is added to a new RRC message or an existing RRC message, and is a list that is set in this embodiment of the present invention, where the list may completely serve the reporting of the 1d event on the secondary frequency. Optionally, in a scenario for the HetNet (heterogeneous network, heterogeneous network), the list may include information about a small cell on the secondary frequency.

Optionally, in this embodiment of the present invention, the UE has a capability of supporting measurement and reporting of the 1d event of the secondary frequency; before the UE obtains the information about the best cell on the secondary frequency and the list of the information about the cells whose frequency is the same as the secondary frequency, the UE may report, to the network device, information about the capability of supporting measurement and reporting of the 1d event of the secondary frequency, and the network device configures, according to the information about the capability that is reported by the UE, the measurement and the reporting of the 1d event of the secondary frequency.

Optionally, this step may be applied to another intra-frequency event that is not a 1d event; when the UE cannot generate an active set on the non-primary frequency, the UE obtains initial information about a cell in the active set on the non-primary frequency that is sent by the network device.

In this embodiment of the present invention, the UE may determine, according to a configuration of the network device, whether to perform CIO (cell individual offset) processing on a 1d event, which is used to indicate intra-frequency measurement, of the secondary frequency.

In this embodiment of the present invention, after obtaining the list of the information about the cells whose frequency is the same as the secondary frequency, the information about the best cell on the secondary frequency, and the intra-frequency measurement and reporting rule of the secondary frequency, the UE may measure, in real time, or at regular time, or when triggered, the cells on the secondary frequency that are included in the list of the information about the cells whose frequency is the same as the secondary frequency. For example, each time the UE measures a cell, the UE may compare signal quality of the measured cell with signal quality included in the information about the best cell on the secondary frequency or with signal quality of a best cell measured by the UE, where the signal quality included in the information about the best cell on the secondary frequency is signal quality corresponding to the best cell on the secondary frequency. If the signal quality of the measured cell is better than the signal quality included in the information about the best cell on the secondary frequency, the UE determines that the UE may report the 1d event on the secondary frequency to the network device, to notify the network device that the best cell on the secondary frequency changes, so that the network device can perform subsequent processing.

That is, one case in which the report condition is met is that: in cells measured by the UE, there is a cell whose signal quality is better than the signal quality included in the information about the best cell on the secondary frequency or cell signal quality corresponding to information about the best cell detected by the UE.

Optionally, in this embodiment of the present invention, if the signal quality of the measured cell is better than the signal quality of the corresponding cell in the information about the best cell on the secondary frequency, and the signal quality of the cell measured within lasting duration (duration information of time to trigger (triggering time) configured in the intra-frequency measurement and reporting rule delivered by the network device) is better than the signal quality of the best cell on the secondary frequency, the UE determines that the report condition is met, and the UE may report the 1d event on the secondary frequency to the network device, to notify the network device that the best cell on the secondary frequency changes, and set the best cell in the 1d event variable of the UE as the measured cell that meets the report condition, so that the network device can perform subsequent processing.

That is, another case in which the report condition is met is that: in cells measured by the UE, there is a cell whose signal quality is better than the signal quality of the corresponding cell in the information about the best cell on the secondary frequency, and signal quality of the measured cell is better than the signal quality of the best cell on the secondary frequency within a time period.

Optionally, in this embodiment of the present invention, the reporting module 202 is further configured to report, to the network device, information about a capability of supporting measurement and reporting of the 1d event of the secondary frequency. That is, the UE has the information about the capability of supporting the measurement and the reporting of the 1d event of the secondary frequency, and the information about the capability of supporting the measurement and the reporting of the 1d event needs to be reported to the network device.

Figure 3:
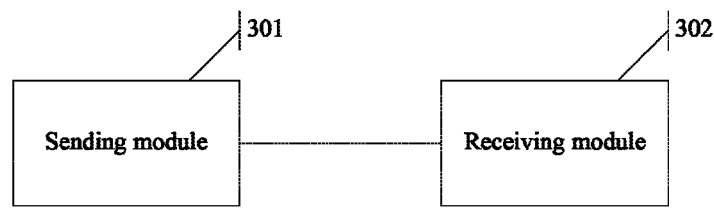
FIG. 3 is a main structural block diagram of a network device according to an embodiment of the present invention.

Referring to FIG. 3, an embodiment of the present invention provides a network device, where the network device may be a base station, or may also be an RNC, or may also be a relay device, or may also be another network device. The network device may include a sending module 301 and a receiving module 302.

The sending module 301 may be configured to send information about a best cell on a secondary frequency and a list of information about cells whose frequency is the same as the secondary frequency to UE, or send a list of information about cells whose frequency is the same as the secondary frequency to the UE.

The receiving module 302 may be configured to receive a 1d event of the secondary frequency that is reported by the UE when a report condition is met, to determine that the best cell on the secondary frequency changes, where the UE works on a first frequency and the secondary frequency, and the first frequency is different from the secondary frequency.

In this embodiment of the present invention, that the UE at least works on a first frequency and the secondary frequency means that the UE receives downlink data at least on the first frequency and the secondary frequency and a network environment at this time is DC-HSDPA, and/or means that the UE performs uplink data transmission at least on the first frequency and the secondary frequency and a network environment at this time is DC-HSUPA.

Optionally, in this embodiment of the present invention, the first frequency may be a primary frequency or a Primary uplink frequency that is configured for the UE, and the secondary frequency may be a secondary frequency or a secondary uplink frequency that is configured for the UE.

Optionally, in this embodiment of the present invention, the UE may work at least on the first frequency and the secondary frequency, or the UE may work in an environment of multiple frequencies. For example, if the UE works in an environment that includes at least three frequencies, the first frequency is the primary frequency, any other frequency except the primary frequency is a non-primary frequency, and each non-primary frequency may be referred to as the secondary frequency. At this time, the UE obtains information about a best cell on the non-primary frequency and a list of information about cells whose frequency is the same as the non-primary frequency.

There may be multiple cells on the secondary frequency; the network device may further include a configuration module, configured to set one of the multiple cells as the best cell; and the information about the best cell is the information about the best cell on the secondary frequency. The best cell is a cell having the best signal quality on the secondary frequency or a cell having the least path loss on the secondary frequency.

The list of the information about the cells whose frequency is the same as the secondary frequency includes information about all cells on the secondary frequency, but may not include the information about the best cell on the secondary frequency.

Optionally, in this embodiment of the present invention, the configuration module sets a specific cell on the secondary frequency on which the UE works as the best cell on the secondary frequency, including that: when it is determined that the UE has a capability of supporting measurement and reporting of the 1d event of the secondary frequency, the configuration module sets a specific cell on the secondary frequency on which the UE works as the best cell on the secondary frequency.

Optionally, in this embodiment of the present invention, the receiving module 302 may further be configured to receive information that is about the capability of supporting the measurement and the reporting of the 1*d* event of the secondary frequency and sent by the UE.

Optionally, in this embodiment of the present invention, the sending module 301 may specifically be configured to send the information about the best cell on the secondary frequency and/or the list of the information about the cells whose frequency is the same as the secondary frequency, or the list of the information about the cells whose frequency is the same as the secondary frequency to the UE by using Measurement Control, or RRC Connection Setup, or PHYSICAL CHANNEL RECONFIGURATION, or RADIO BEARER RECONFIGURATION, or RADIO BEARER SETUP.

Optionally, the network device may further send an intra-frequency measurement and reporting rule of the secondary frequency to the UE by using the sending module 301, so that the UE measures the cells whose frequency is the same as the secondary frequency and reports the 1*d* event according to the intra-frequency measurement and reporting rule of the secondary frequency and the list of the information about the cells whose frequency is the same as the secondary frequency. Optionally, the network device may send the list of the information about the cells whose frequency is the same as the secondary frequency, the information about the best cell on the secondary frequency, and the intra-frequency measurement and reporting rule of the secondary frequency to the UE by using one message; in this way, the UE can receive the information together, thereby reducing a quantity of messages, and saving transmission resources.

Optionally, in this embodiment of the present invention, the list of the information about the cells whose frequency is the same as the secondary frequency is a list of information about intra-frequency cells on the secondary frequency, or a list of information about 1*d* event of intra-frequency cells on the secondary frequency.

Optionally, the list of information about intra-frequency cells on the secondary frequency may specifically refer to an existing IE: Intra-frequency cell info list on secondary UL frequency in a message, and this is an existing list of information about cells whose frequency is the same as the secondary frequency in the network device. The network device may add the information about the cells on the secondary frequency to the list, and send the list to the UE.

Optionally, the list of the information about the cells whose frequency is the same as the secondary frequency may specifically refer to the list of information about 1*d* event of intra-frequency cells on the secondary frequency, which is a list that is generated by the network device according to the information about the cells on the secondary frequency, may be an IE that is added to a new RRC message or an existing RRC message, and is a list that is set in this embodiment of the present invention, where the list may completely serve the reporting of the 1*d* event on the secondary frequency. Optionally, in a scenario for the HetNet (heterogeneous network, heterogeneous network), the list may include information about a small cell on the secondary frequency.

Figure 4:
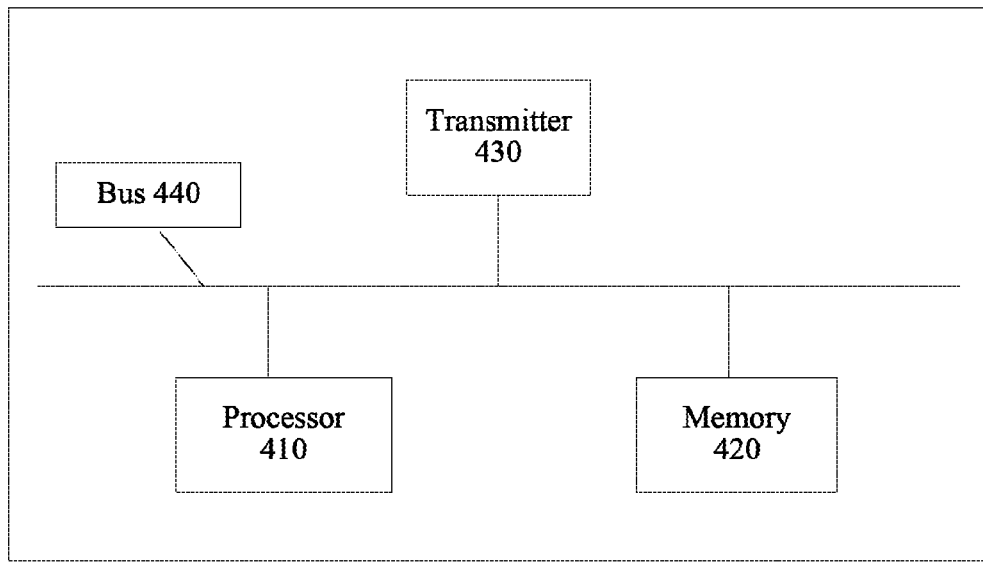
FIG. 4 is a main schematic structural diagram of UE according to an embodiment of the present invention.

Referring to FIG. 4, an embodiment of the present invention provides UE. The UE includes: a bus 440, and a processor 410, a memory 420, and a transmitter 430 that are connected to the bus 440. The memory 420 is configured to store an instruction. The processor 410 is configured to perform the instruction, to obtain information about a best cell on a secondary frequency and a list of information about cells whose frequency is the same as the secondary frequency, where the UE at least works on a first frequency and the secondary frequency, and the first frequency is different from the secondary frequency. The transmitter 430 is configured to: if a report condition is met, report a 1*d* event of the secondary frequency to a network device, to notify the network device that the best cell on the secondary frequency changes.

In this embodiment of the present invention, the first frequency is different from the secondary frequency, and the first frequency may be adjacent or may not be adjacent to the secondary frequency. That the UE at least works on a first frequency and the secondary frequency means that the UE receives downlink data at least on the first frequency and the secondary frequency and a network environment at this time is DC-HSDPA, and/or means that the UE performs uplink data transmission at least on the first frequency and the secondary frequency and a network environment at this time is DC-HSUPA; the UE may initialize and maintain a UE active set on the secondary frequency; for the 1*d* event, a best cell in the active set may be set as a best cell of a 1*d* event variable of the UE, and the best cell is stored.

Optionally, in this embodiment of the present invention, the first frequency may be a primary frequency or a Primary uplink frequency that is configured for the UE, and the secondary frequency may be a secondary frequency or a secondary uplink frequency that is configured for the UE.

Optionally, in this embodiment of the present invention, the UE may work at least on the first frequency and the secondary frequency, or the UE may work in an environment of multiple frequencies. For example, if the UE works in an environment that includes at least three frequencies, the first frequency is the primary frequency, any other frequency except the primary frequency is a non-primary frequency, and each non-primary frequency may be referred to as the secondary frequency. At this time, the UE obtains information about a best cell on the non-primary frequency and a list of information about intra-frequency cells on the non-primary frequency.

Optionally, in this embodiment of the present invention, the UE further includes a receiver that is connected to the bus 440, and the processor 410 is specifically configured to perform the instruction, to obtain the information about the best cell on the secondary frequency and the list of the information about the cells whose frequency is the same as the secondary frequency that are sent by the network device.

There may be multiple cells on the secondary frequency, one of which is set as the best cell, and the information about the best cell is the information about the best cell on the secondary frequency. The best cell is a cell having the best signal quality on the secondary frequency or a cell having the least path loss on the secondary frequency.

The list of the information about the cells whose frequency is the same as the secondary frequency includes information about all cells on the secondary frequency, but may not include the information about the best cell on the secondary frequency.

Optionally, in this embodiment of the present invention, the processor 410 is specifically configured to perform the instruction, to receive, by using the receiver, Measurement Control, or RRC Connection Setup, or PHYSICAL CHANNEL RECONFIGURATION, or RADIO BEARER RECONFIGURATION, or RADIO BEARER SETUP that carries the information about the best cell on the secondary frequency and the list of the information about the cells whose frequency is the same as the secondary frequency and is sent by the network device, and obtain the information about the best cell on the secondary frequency and the list of the information about the cells whose frequency is the same as the secondary frequency.

That is, in this embodiment, the network device sets a cell on the secondary frequency as the best cell on the secondary frequency, where information about the cell is the information about the best cell on the secondary frequency; the network device may further add the information about the cells on the secondary frequency to the list of the information about the cells whose frequency is the same as the secondary frequency. The network device may send both the information about the best cell on the secondary frequency and the list of the information about the cells whose frequency is the same as the secondary frequency to the UE. The UE generates a $1d$ event variable of the UE according to the received information about the best cell on the secondary frequency, and initializes a corresponding cell in the received information about the best cell on the secondary frequency to a best cell of the $1d$ event variable of the UE.

Optionally, the network device may further send an intra-frequency measurement and reporting rule of the secondary frequency to the UE, and the processor 410 receives the rule by using the receiver, so that the UE measures the cells whose frequency is the same as the secondary frequency and reports the $1d$ event according to the intra-frequency measurement and reporting rule of the secondary frequency and the list of the information about the cells whose frequency is the same as the secondary frequency. Optionally, the network device may send the list of the information about the cells whose frequency is the same as the secondary frequency, the information about the best cell on the secondary frequency, and the intra-frequency measurement and reporting rule of the secondary frequency to the UE by using one message; in this way, the UE can receive the information together, thereby reducing a quantity of messages, and saving transmission resources.

Optionally, in this embodiment of the present invention, the UE further includes the receiver that is connected to the bus 440. The processor 410 is specifically configured to perform the instruction, to set a cell on the secondary frequency as the best cell on the secondary frequency, and obtain the information about the best cell on the secondary frequency of the best cell on the secondary frequency; and obtain, by using the receiver, the list of the information about the cells whose frequency is the same as the secondary frequency that is sent by the network device.

Optionally, in this embodiment of the present invention, the processor 410 is specifically configured to perform the instruction, to receive, by using the receiver, Measurement Control, or RRC Connection Setup, or PHYSICAL CHANNEL RECONFIGURATION, or RADIO BEARER RECONFIGURATION, or RADIO BEARER SETUP that carries the list of the information about the cells whose frequency is the same as the secondary frequency and is sent by the network device, and obtain the list of the information about the cells whose frequency is the same as the secondary frequency.

That is, in this embodiment, the UE sets a cell on the secondary frequency as the best cell on the secondary frequency, where information about the cell is the information about the best cell on the secondary frequency; the network device may add the information about the cells on the secondary frequency to the list of the information about the cells whose frequency is the same as the secondary frequency. The network device may send the list of the information about the cells whose frequency is the same as the secondary frequency to the UE.

Optionally, the network device may further send an intra-frequency measurement and reporting rule of the secondary frequency to the UE, and the processor 410 receives the rule by using the receiver, so that the UE measures the cells whose frequency is the same as the secondary frequency and reports the $1d$ event according to the intra-frequency measurement and reporting rule of the secondary frequency and the list of the information about the cells whose frequency is the same as the secondary frequency. Optionally, the network device may send the list of the information about the cells whose frequency is the same as the secondary frequency, and the intra-frequency measurement and reporting rule of the secondary frequency to the UE by using one message; in this way, the UE can receive the information together, thereby reducing a quantity of messages, and saving transmission resources.

Optionally, in this embodiment of the present invention, that the processor 410 is specifically configured to perform the instruction, to set a cell on the secondary frequency as the best cell on the secondary frequency is specifically: if there is a secondary serving HS-DSCH cell, which is configured for the UE, on the secondary frequency, setting the secondary serving HS-DSCH cell as the best cell on the secondary frequency; or if there is no secondary serving HS-DSCH cell, which is configured for the UE, but an assisting secondary serving HS-DSCH cell, which is configured for the UE, on the secondary frequency, setting the assisting secondary serving HS-DSCH cell as the best cell on the secondary frequency; or performing, by the UE, measurement according to an obtained list of information about the cells whose frequency is the same as the secondary frequency, and setting a detected best cell as the best cell on the secondary frequency; or performing, by the UE, measurement according to an obtained list of information about inter-frequency cells on the secondary frequency, setting a detected best cell as the best cell on the secondary frequency; and generating the $1d$ event variable of the UE, and initializing a determined best cell on the secondary frequency to the best cell of the $1d$ event variable of the UE.

Optionally, in this embodiment of the present invention, that the processor 410 is specifically configured to perform the instruction, to set a cell on the secondary frequency as the best cell on the secondary frequency is specifically: if the UE has an active set, initializing a best cell in the active set to the best cell; and if the UE has no active set, initializing a best cell in a list of information about inter-frequency cells on the secondary frequency or a list of the information about the cells whose frequency is the same as the secondary frequency to the best cell.

Optionally, in this embodiment of the present invention, the list of the information about the cells whose frequency is the same as the secondary frequency is a list of information about intra-frequency cells on the secondary frequency, or a list of information about $1d$ event of intra-frequency cells on the secondary frequency.

Optionally, the list of information about intra-frequency cells on the secondary frequency may specifically refer to an existing IE (information element): Intra-frequency cell info list on secondary UL frequency in a message, and this is an existing list of information about cells whose frequency is the same as the secondary frequency in the network device. The network device may add the information about the cells on the secondary frequency to the list, and send the list to the UE.

Optionally, the list of the information about the cells whose frequency is the same as the secondary frequency may specifically refer to the list of information about 1d event of intra-frequency cells on the secondary frequency, which is a list that is generated by the network device according to the information about the cells on the secondary frequency, may be an IE that is added to a new RRC message or an existing RRC message, and is a list that is set in this embodiment of the present invention, where the list may completely serve the reporting of the 1d event on the secondary frequency. Optionally, in a scenario for the HetNet, the list may include information about a small cell on the secondary frequency.

Optionally, in this embodiment of the present invention, the UE has a capability of supporting measurement and reporting of the 1d event of the secondary frequency; before the UE obtains the information about the best cell on the secondary frequency and the list of the information about the cells whose frequency is the same as the secondary frequency, the transmitter 430 may report, to the network device, information about the capability of supporting the measurement and the reporting of the 1d event of the secondary frequency, and the network device configures, according to the information about the capability that is reported by the UE, the measurement and the reporting of the 1d event of the secondary frequency.

In this embodiment of the present invention, the UE may determine, according to a configuration of the network device, whether to perform CIO processing on a 1d event, which is used to indicate intra-frequency measurement, of the secondary frequency.

In this embodiment of the present invention, after obtaining the list of the information about the cells whose frequency is the same as the secondary frequency, the information about the best cell on the secondary frequency, and the intra-frequency measurement and reporting rule of the secondary frequency, the UE may measure, in real time, or at regular time, or when triggered, the cells on the secondary frequency that are included in the list of the information about the cells whose frequency is the same as the secondary frequency. For example, each time the UE measures a cell, the UE may compare signal quality of the measured cell with signal quality included in the information about the best cell on the secondary frequency or with signal quality of a best cell measured by the UE, where the signal quality included in the information about the best cell on the secondary frequency is signal quality corresponding to the best cell on the secondary frequency. If the signal quality of the measured cell is better than the signal quality included in the information about the best cell on the secondary frequency, the UE determines that the UE may report the 1d event on the secondary frequency to the network device, to notify the network device that the best cell on the secondary frequency changes, so that the network device can perform subsequent processing.

That is, one case in which the report condition is met is that: in cells measured by the UE, there is a cell whose signal quality is better than the signal quality included in the information about the best cell on the secondary frequency or cell signal quality corresponding to information about the best cell detected by the UE.

Optionally, in this embodiment of the present invention, if the signal quality of the measured cell is better than the signal quality of the corresponding cell in the information about the best cell on the secondary frequency, and cell signal quality measured within lasting duration (duration information of time to trigger configured in the intra-frequency measurement and reporting rule delivered by the network device) is better than the signal quality of the best cell on the secondary frequency, the UE determines that the report condition is met, and the UE may report the 1d event on the secondary frequency to the network device, to notify the network device that the best cell on the secondary frequency changes, and set the best cell in the 1d event variable of the UE as the measured cell that meets the report condition, so that the network device can perform subsequent processing.

That is, another case in which the report condition is met is that: in cells measured by the UE, there is a cell whose signal quality is better than the signal quality of the corresponding cell in the information about the best cell on the secondary frequency, and signal quality of the measured cell is better than the signal quality of the best cell on the secondary frequency within a time period.

Figure 5:
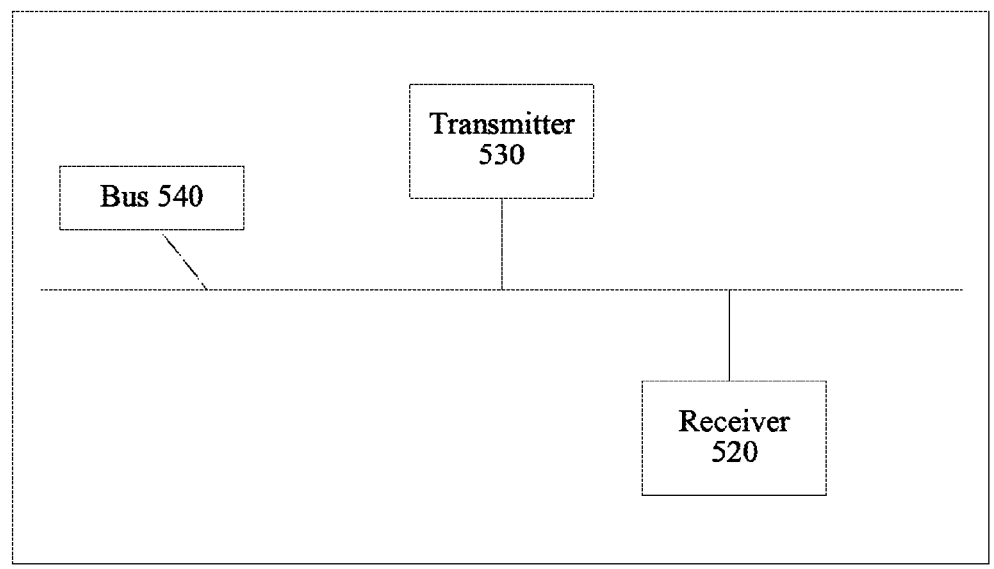
FIG. 5 is a main schematic structural diagram of a network device according to an embodiment of the present invention.

Referring to FIG. 5, an embodiment of the present invention provides a network device, where the network device is a base station, or may also be an RNC, or may also be a relay device, or may also be another network device. The network device includes a bus 540, and a transmitter 530 and a receiver 520 that are connected to the bus 540. The transmitter 530 is configured to send information about a best cell on a secondary frequency and a list of information about cells whose frequency is the same as the secondary frequency to UE, or send, by the network device, the list of the information about the cells whose frequency is the same as the secondary frequency to the UE. The receiver 520 is configured to receive a 1d event of the secondary frequency that is reported by the UE when a report condition is met, to determine that the best cell on the secondary frequency changes, where the UE works on a first frequency and the secondary frequency, and the first frequency is different from the secondary frequency.

In this embodiment of the present invention, that the UE at least works on a first frequency and the secondary frequency means that the UE receives downlink data at least on the first frequency and the secondary frequency and a network environment at this time is DC-HSDPA, and/or means that the UE performs uplink data transmission at least on the first frequency and the secondary frequency and a network environment at this time is DC-HSUPA.

Optionally, in this embodiment of the present invention, the first frequency may be a primary frequency or a Primary uplink frequency that is configured for the UE, and the secondary frequency may be a secondary frequency or a secondary uplink frequency that is configured for the UE.

Optionally, in this embodiment of the present invention, the UE may work at least on the first frequency and the secondary frequency, or the UE may work in an environment of multiple frequencies. For example, if the UE works in an environment that includes at least three frequencies, the first frequency is the primary frequency, any other frequency except the primary frequency is a non-primary frequency, and each non-primary frequency may be referred to as the secondary frequency. At this time, the UE obtains information about a best cell on the non-primary frequency and a list of information about intra-frequency cells on the non-primary frequency.

There may be multiple cells on the secondary frequency, one of which is set as the best cell by the network device, and the information about the best cell is the information about the best cell on the secondary frequency. The best cell is a cell having the best signal quality on the secondary frequency or a cell having the least path loss on the secondary frequency.

The list of the information about the cells whose frequency is the same as the secondary frequency includes information about all cells on the secondary frequency, but may not include the information about the best cell on the secondary frequency.

Optionally, in this embodiment of the present invention, the network device further includes a processor that is connected to the bus 540, and the processor may be configured to set a specific cell on the secondary frequency on which the UE works as the best cell on the secondary frequency, specifically: when it is determined that the UE has a capability of supporting measurement and reporting of the 1$d$ event of the secondary frequency, setting a specific cell on the secondary frequency on which the UE works as the best cell on the secondary frequency.

Optionally, in this embodiment of the present invention, the receiver 520 is further configured to receive information that is about the capability of supporting the measurement and the reporting of the 1$d$ event of the secondary frequency and sent by the UE.

Optionally, in this embodiment of the present invention, the transmitter 530 is specifically configured to send the information about the best cell on the secondary frequency and/or the list of the information about the cells whose frequency is the same as the secondary frequency, or the list of the information about the cells whose frequency is the same as the secondary frequency to the UE by using Measurement Control, or RRC Connection Setup, or PHYSICAL CHANNEL RECONFIGURATION, or RADIO BEARER RECONFIGURATION, or RADIO BEARER SETUP.

Optionally, the network device may further send an intra-frequency measurement and reporting rule of the secondary frequency to the UE by using the transmitter 530, so that the UE measures the cells whose frequency is the same as the secondary frequency and reports the 1$d$ event according to the intra-frequency measurement and reporting rule of the secondary frequency and the list of the information about the cells whose frequency is the same as the secondary frequency. Optionally, the network device may send the list of the information about the cells whose frequency is the same as the secondary frequency, the information about the best cell on the secondary frequency, and the intra-frequency measurement and reporting rule of the secondary frequency to the UE by using one message; in this way, the UE can receive the information together, thereby reducing a quantity of messages, and saving transmission resources.

Optionally, in this embodiment of the present invention, the list of the information about the cells whose frequency is the same as the secondary frequency is a list of information about intra-frequency cells on the secondary frequency, or a list of information about 1$d$ event of intra-frequency cells on the secondary frequency.

Optionally, the list of information about intra-frequency cells on the secondary frequency may specifically refer to an existing IE: Intra-frequency cell info list on secondary UL frequency in a message, and this is an existing list of information about cells whose frequency is the same as the secondary frequency in the network device. The network device may add the information about the cells on the secondary frequency to the list, and send the list to the UE.

Optionally, the list of the information about the cells whose frequency is the same as the secondary frequency may specifically refer to the list of information about 1$d$ event of intra-frequency cells on the secondary frequency, which is a list that is generated by the network device according to the information about the cells on the secondary frequency, may be an IE that is added to a new RRC message or an existing RRC message, and is a list that is set in this embodiment of the present invention, where the list may completely serve the reporting of the 1$d$ event on the secondary frequency. Optionally, in a scenario for the HetNet, the list may include information about a small cell on the secondary frequency.

Figure 6:
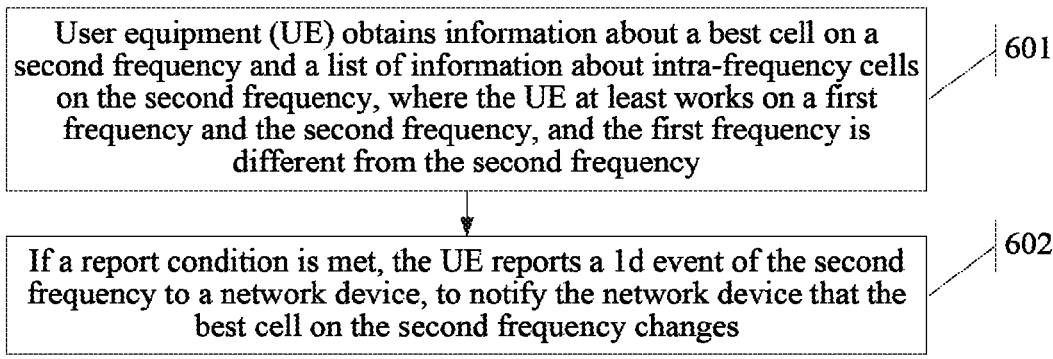
FIG. 6 is a main flowchart of an information reporting method according to an embodiment of the present invention.

Referring to FIG. 6, an embodiment of the present invention provides an information reporting method. A main procedure of the method is described as follows.

Step 601: User equipment (UE) obtains information about a best cell on a secondary frequency and a list of information about cells whose frequency is the same as the secondary frequency, where the UE at least works on a first frequency and the secondary frequency, and the first frequency is different from the secondary frequency.

In this embodiment of the present invention, the first frequency is different from the secondary frequency, and the first frequency may be adjacent or may not be adjacent to the secondary frequency. That the UE at least works on a first frequency and the secondary frequency means that the UE receives downlink data at least on the first frequency and the secondary frequency and a network environment at this time is DC-HSDPA, and/or means that the UE performs uplink data transmission at least on the first frequency and the secondary frequency and a network environment at this time is DC-HSUPA; the UE may initialize and maintain a UE active set on the secondary frequency; for the 1$d$ event, a best cell in the active set may be set as a best cell of a 1$d$ event variable of the UE, and the best cell is stored.

Optionally, in this embodiment of the present invention, the first frequency may be a primary frequency or a Primary uplink frequency that is configured for the UE, and the secondary frequency may be a secondary frequency or a secondary uplink frequency that is configured for the UE.

Optionally, in this embodiment of the present invention, the UE may work at least on the first frequency and the secondary frequency, or the UE may work in an environment of multiple frequencies. For example, if the UE works in an environment that includes at least three frequencies, the first frequency is the primary frequency, any other frequency except the primary frequency is a non-primary frequency, and each non-primary frequency may be referred to as the secondary frequency. At this time, the UE obtains information about a best cell on the non-primary frequency and a list of information about intra-frequency cells on the non-primary frequency.

There may be multiple cells on the secondary frequency, one of which is set as the best cell, and the information about the best cell is the information about the best cell on the secondary frequency. The best cell is a cell having the best signal quality on the secondary frequency or a cell having the least path loss on the secondary frequency.

The list of the information about the cells whose frequency is the same as the secondary frequency includes information about all cells on the secondary frequency, but may not include the information about the best cell on the secondary frequency.

Optionally, in an embodiment of the present invention, one possible manner in which the UE obtains the information about the best cell on the secondary frequency and the list of the information about the cells whose frequency is the same as the secondary frequency is that: the UE obtains the information about the best cell on the secondary frequency and the list of the information about the cells whose frequency is the same as the secondary frequency that are sent by a network device.

That is, in this embodiment, the network device sets a cell on the secondary frequency as the best cell on the secondary frequency, where information about the cell is the information about the best cell on the secondary frequency; the network device may further add the information about the cells on the secondary frequency to the list of the information about the cells whose frequency is the same as the secondary frequency. The network device may send both the information about the best cell on the secondary frequency and the list of the information about the cells whose frequency is the same as the secondary frequency to the UE. The UE generates a $1d$ event variable of the UE according to the received information about the best cell on the secondary frequency, and initializes a corresponding cell in the received information about the best cell on the secondary frequency to a best cell of the $1d$ event variable of the UE.

Optionally, the network device may further send an intra-frequency measurement and reporting rule of the secondary frequency to the UE, so that the UE measures the cells whose frequency is the same as the secondary frequency and reports the $1d$ event according to the intra-frequency measurement and reporting rule of the secondary frequency and the list of the information about the cells whose frequency is the same as the secondary frequency. Optionally, the network device may send the list of the information about the cells whose frequency is the same as the secondary frequency, the information about the best cell on the secondary frequency, and the intra-frequency measurement and reporting rule of the secondary frequency to the UE by using one message; in this way, the UE can receive the information together, thereby reducing a quantity of messages, and saving transmission resources.

Optionally, that the UE obtains the information about the best cell on the secondary frequency and the list of the information about the cells whose frequency is the same as the secondary frequency that are sent by the network device may specifically be: receiving, by the UE, Measurement Control, or RRC Connection Setup, or PHYSICAL CHANNEL RECONFIGURATION, or RADIO BEARER RECONFIGURATION, or RADIO BEARER SETUP, or another message that carries the information about the best cell on the secondary frequency and the list of the information about the cells whose frequency is the same as the secondary frequency and is sent by the network device, and obtaining the information about the best cell on the secondary frequency and the list of the information about the cells whose frequency is the same as the secondary frequency.

Optionally, in an embodiment of the present invention, another possible manner in which the UE obtains the information about the best cell on the secondary frequency and the list of the information about the cells whose frequency is the same as the secondary frequency is that: the UE sets a cell on the secondary frequency as the best cell on the secondary frequency, and obtains the information about the best cell on the secondary frequency; and the UE obtains the list of the information about the cells whose frequency is the same as the secondary frequency that is sent by the network device.

That is, in this embodiment, the UE sets a cell on the secondary frequency as the best cell on the secondary frequency, where information about the cell is the information about the best cell on the secondary frequency; and the network device may add the information about the cells on the secondary frequency to the list of the information about the cells whose frequency is the same as the secondary frequency. The network device may send the list of the information about the cells whose frequency is the same as the secondary frequency to the UE.

Optionally, the network device may further send an intra-frequency measurement and reporting rule of the secondary frequency to the UE, so that the UE measures the cells whose frequency is the same as the secondary frequency and reports the $1d$ event according to the intra-frequency measurement and reporting rule of the secondary frequency and the list of the information about the cells whose frequency is the same as the secondary frequency. Optionally, the network device may send the list of the information about the cells whose frequency is the same as the secondary frequency, and the intra-frequency measurement and reporting rule of the secondary frequency to the UE by using one message; in this way, the UE can receive the information together, thereby reducing a quantity of messages, and saving transmission resources.

Optionally, in this embodiment of the present invention, the obtaining, by the UE, the list of the information about the cells whose frequency is the same as the secondary frequency that is sent by the network device may include: receiving, by the UE, the Measurement Control, or the RRC Connection Setup, or the PHYSICAL CHANNEL RECONFIGURATION, or the RADIO BEARER RECONFIGURATION, or the RADIO BEARER SETUP, or the like that carries the list of the information about the cells whose frequency is the same as the secondary frequency and is sent by the network device, and obtaining the list of the information about the cells whose frequency is the same as the secondary frequency. That is, the network device may send the list of the information about the cells whose frequency is the same as the secondary frequency to the UE by using different messages.

Optionally, in this embodiment of the present invention, that the UE sets a cell on the secondary frequency as the best cell on the secondary frequency may specifically be that: 1. if there is a secondary serving HS-DSCH cell, which is configured for the UE, on the secondary frequency, the UE sets the secondary serving HS-DSCH cell as the best cell on the secondary frequency; or 2. if there is no secondary serving HS-DSCH cell, which is configured for the UE, but an assisting secondary serving HS-DSCH cell, which is configured for the UE, on the secondary frequency, the UE sets the assisting secondary serving HS-DSCH cell as the best cell on the secondary frequency; or 3. the UE performs measurement according to an obtained list of the information about the cells whose frequency is the same as the secondary frequency, and sets a detected best cell as the best cell on the secondary frequency; or 4. the UE performs measurement according to an obtained list of information about inter-frequency cells on the secondary frequency, sets a detected best cell as the best cell on the secondary frequency, generates the $1d$ event variable of the UE, and initializes a determined best cell on the secondary frequency to the best cell of the $1d$ event variable of the UE. For conditions 1 and 2, after the best cell on the secondary frequency is set, the $1d$ event is reported only when a $1d$ event triggering condition is met; however, for conditions 3 and 4, if a corresponding list of information about cells includes information about more than one cell, after setting the best cell on the secondary frequency, the UE immediately triggers the reporting of the $1d$ event, so as to ensure that the network device obtains information about the best cell initialized by the UE.

Optionally, in this embodiment of the present invention, the setting, by the UE, a cell on the secondary frequency as the best cell on the secondary frequency may specifically be:

if the UE has an active set, initializing a best cell in the active set to the best cell; and if the UE has no active set, initializing a best cell in a list of information about inter-frequency cells on the secondary frequency or a list of information about the cells whose frequency is the same as the secondary frequency to the best cell.

Optionally, in this embodiment of the present invention, the list of the information about the cells whose frequency is the same as the secondary frequency is a list of information about intra-frequency cells on the secondary frequency, or a list of information about $1d$ event of intra-frequency cells on the secondary frequency.

Optionally, the list of information about intra-frequency cells on the secondary frequency may specifically refer to an existing IE: Intra-frequency cell info list on secondary UL frequency in a message, and this is an existing list of information about cells whose frequency is the same as the secondary frequency in the network device. The network device may add the information about the cells on the secondary frequency to the list, and send the list to the UE.

Optionally, the list of the information about the cells whose frequency is the same as the secondary frequency may specifically refer to the list of information about $1d$ event of intra-frequency cells on the secondary frequency, which is a list that is generated by the network device according to the information about the cells on the secondary frequency, may be an IE that is added to a new RRC message or an existing RRC message, and is a list that is set in this embodiment of the present invention, where the list may completely serve the reporting of the $1d$ event on the secondary frequency. Optionally, in a scenario for the Het-Net, the list may include information about a small cell on the secondary frequency.

Optionally, in this embodiment of the present invention, the UE has a capability of supporting measurement and reporting of the $1d$ event of the secondary frequency; before the UE obtains the information about the best cell on the secondary frequency and the list of the information about the cells whose frequency is the same as the secondary frequency, the UE may report, to the network device, information about the capability of supporting the measurement and the reporting of the $1d$ event of the secondary frequency, and the network device configures, according to the information about the capability that is reported by the UE, the measurement and the reporting of the $1d$ event of the secondary frequency.

Optionally, this step may be applied to another intra-frequency event that is not a $1d$ event; when the UE cannot generate an active set on the non-primary frequency, the UE obtains initial information about a cell in the active set on the non-primary frequency that is sent by the network device.

Step 602: If a report condition is met, the UE reports a $1d$ event of the secondary frequency to a network device, to notify the network device that the best cell on the secondary frequency changes.

In this embodiment of the present invention, the UE may determine, according to a configuration of the network device, whether to perform CIO processing on a $1d$ event, which is used to indicate intra-frequency measurement, of the secondary frequency.

In this embodiment of the present invention, after obtaining the list of the information about the cells whose frequency is the same as the secondary frequency, the information about the best cell on the secondary frequency, and the intra-frequency measurement and reporting rule of the secondary frequency, the UE may measure, in real time, or at regular time, or when triggered, the cells on the secondary frequency that are included in the list of the information about the cells whose frequency is the same as the secondary frequency. For example, each time the UE measures a cell, the UE may compare signal quality of the measured cell with signal quality included in the information about the best cell on the secondary frequency or with signal quality of a best cell measured by the UE, where the signal quality included in the information about the best cell on the secondary frequency is signal quality corresponding to the best cell on the secondary frequency. If the signal quality of the measured cell is better than the signal quality included in the information about the best cell on the secondary frequency, the UE determines that the UE may report the $1d$ event on the secondary frequency to the network device, to notify the network device that the best cell on the secondary frequency changes, so that the network device can perform subsequent processing.

That is, one case in which the report condition is met is that: in cells measured by the UE, there is a cell whose signal quality is better than the signal quality included in the information about the best cell on the secondary frequency or cell signal quality corresponding to information about the best cell detected by the UE.

Optionally, in this embodiment of the present invention, if the signal quality of the measured cell is better than the signal quality of the corresponding cell in the information about the best cell on the secondary frequency, and cell signal quality measured within lasting duration (duration information of time to trigger configured in the intra-frequency measurement and reporting rule delivered by the network device) is better than the signal quality of the best cell on the secondary frequency, the UE determines that the report condition is met, and the UE may report the $1d$ event on the secondary frequency to the network device, to notify the network device that the best cell on the secondary frequency changes, and set the best cell in the $1d$ event variable of the UE as the measured cell that meets the report condition, so that the network device can perform subsequent processing.

That is, another case in which the report condition is met is that: in cells measured by the UE, there is a cell whose signal quality is better than the signal quality of the corresponding cell in the information about the best cell on the secondary frequency, and signal quality of the measured cell is better than the signal quality of the best cell on the secondary frequency within a time period.

Figure 7:
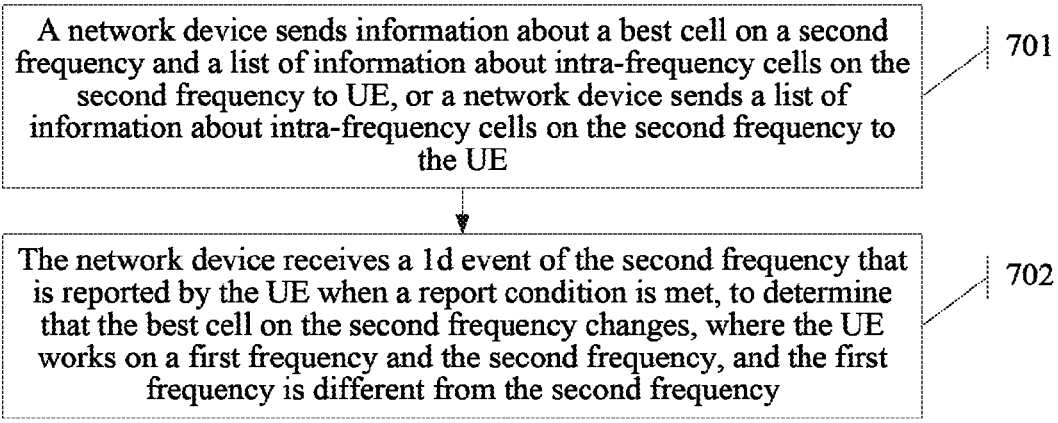
FIG. 7 is a main flowchart of an information receiving method according to an embodiment of the present invention.

Referring to FIG. 7, an embodiment of the present invention provides an information receiving method.

Step 701: A network device sends information about a best cell on a secondary frequency and a list of information about cells whose frequency is the same as the secondary frequency to UE, or a network device sends a list of information about cells whose frequency is the same as the secondary frequency to the UE.

There may be multiple cells on the secondary frequency, one of which is set as the best cell by the network device, and the information about the best cell is the information about the best cell on the secondary frequency. The best cell is a cell having the best signal quality on the secondary frequency or a cell having the least path loss on the secondary frequency.

The list of the information about the cells whose frequency is the same as the secondary frequency includes information about all cells on the secondary frequency, but may not include the information about the best cell on the secondary frequency.

Optionally, in this embodiment of the present invention, the network device sets a specific cell on the secondary frequency on which the UE works as the best cell on the secondary frequency, including that: when it is determined that the UE has a capability of supporting measurement and reporting of a 1$d$ event of the secondary frequency, the network device sets a specific cell on the secondary frequency on which the UE works as the best cell on the secondary frequency.

That is, before the sending, by the network device, the information about the best cell on the secondary frequency and/or the list of the information about the cells whose frequency is the same as the secondary frequency to the UE, the method further includes: receiving, by the network device, information about the capability of supporting the measurement and the reporting of the 1$d$ event of the secondary frequency.

Optionally, in this embodiment of the present invention, the sending, by the network device, the information about the best cell on the secondary frequency and the list of the information about the cells whose frequency is the same as the secondary frequency to the UE may include: sending, by the network device, the information about the best cell on the secondary frequency and the list of the information about the cells whose frequency is the same as the secondary frequency to the UE by using Measurement Control, or RRC Connection Setup, or PHYSICAL CHANNEL RECONFIGURATION, or RADIO BEARER RECONFIGURATION, or RADIO BEARER SETUP, or the like.

Optionally, the network device may further send an intra-frequency measurement and reporting rule of the secondary frequency to the UE, so that the UE measures the cells whose frequency is the same as the secondary frequency and reports the 1$d$ event according to the intra-frequency measurement and reporting rule of the secondary frequency and the list of the information about the cells whose frequency is the same as the secondary frequency. Optionally, the network device may send the list of the information about the cells whose frequency is the same as the secondary frequency, the information about the best cell on the secondary frequency, and the intra-frequency measurement and reporting rule of the secondary frequency to the UE by using one message; in this way, the UE can receive the information together, thereby reducing a quantity of messages, and saving transmission resources.

Optionally, in this embodiment of the present invention, the list of the information about the cells whose frequency is the same as the secondary frequency is a list of information about intra-frequency cells on the secondary frequency, or a list of information about 1$d$ event of intra-frequency cells on the secondary frequency.

Optionally, the list of information about intra-frequency cells on the secondary frequency may specifically refer to an existing IE: Intra-frequency cell info list on secondary UL frequency in a message, and this is an existing list of information about cells whose frequency is the same as the secondary frequency in the network device. The network device may add the information about the cells on the secondary frequency to the list, and send the list to the UE.

Optionally, the list of the information about the cells whose frequency is the same as the secondary frequency may specifically refer to the list of information about 1$d$ event of intra-frequency cells on the secondary frequency, which is a list that is generated by the network device according to the information about the cells on the secondary frequency, may be an IE that is added to a new RRC message or an existing RRC message, and is a list that is set in this embodiment of the present invention, where the list may completely serve the reporting of the 1$d$ event on the secondary frequency. Optionally, in a scenario for the HetNet (heterogeneous network, heterogeneous network), the list may include information about a small cell on the secondary frequency.

Step 702: The network device receives a 1$d$ event of the secondary frequency that is reported by the UE when a report condition is met, to determine that the best cell on the secondary frequency changes, where the UE works on a first frequency and the secondary frequency, and the first frequency is different from the secondary frequency.

In this embodiment of the present invention, that the UE at least works on a first frequency and the secondary frequency means that the UE receives downlink data at least on the first frequency and the secondary frequency and a network environment at this time is DC-HSDPA, and/or means that the UE performs uplink data transmission at least on the first frequency and the secondary frequency and a network environment at this time is DC-HSUPA.

Optionally, in this embodiment of the present invention, the first frequency may be a primary frequency or a Primary uplink frequency that is configured for the UE, and the secondary frequency may be a secondary frequency or a secondary uplink frequency that is configured for the UE.

Optionally, in this embodiment of the present invention, the UE may work at least on the first frequency and the secondary frequency, or the UE may work in an environment of multiple frequencies. For example, if the UE works in an environment that includes at least three frequencies, the first frequency is the primary frequency, any other frequency except the primary frequency is a non-primary frequency, and each non-primary frequency may be referred to as the secondary frequency. At this time, the UE obtains information about a best cell on the non-primary frequency and a list of information about intra-frequency cells on the non-primary frequency.

An embodiment of the present invention provides an information reporting method. The method includes: obtaining, by UE, information about a best cell on a secondary frequency and a list of information about cells whose frequency is the same as the secondary frequency, where the UE at least works on a first frequency and the secondary frequency; and if a report condition is met, reporting, by the UE, a 1$d$ event of the secondary frequency to a network device, to notify the network device that the best cell on the secondary frequency changes.

In this embodiment of the present invention, UE may obtain information about a best cell on a secondary frequency and a list of information about cells whose frequency is the same as the secondary frequency, and therefore the UE may measure all cells on the secondary frequency according to the list of the information about the cells whose frequency is the same as the secondary frequency, and may compare information about other cells with the information about the best cell; if a report condition is met, the UE may report a 1$d$ event of the secondary frequency, and notify a network device that the best cell on the secondary frequency changes, so that the network device may perform, according to the 1$d$ event reported by the UE, a subsequent operation, such as an operation of changing a serving HS-DSCH cell of the UE to a cell 3, an operation of configuring the UE to perform a DF-3C operation, or configuring an SF-DC operation on a frequency F2; in addition, the UE may also report another 1$x$ event of the secondary frequency, thereby effectively solving a problem in the prior art.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions and the foregoing embodiments are merely used to introduce the technical solutions of this application in detail. The descriptions of the foregoing embodiments are merely used to help understand the methods and core ideas of the present invention, but should not be construed as a limitation to the present invention. Any variation or replacement readily figured out by a person skilled in the art within the technical scope disclosed in the present invention shall fall within the protection scope of the present invention.

What is claimed is:

1. An information reporting method, comprising:
   obtaining, by a terminal, a best cell on a secondary frequency and a list of information about cells that have a frequency that is the same as the secondary frequency, wherein the terminal works on a primary frequency and the secondary frequency, the primary frequency being different from the secondary frequency;
   determining that a report condition has been met, wherein the report condition comprises information that signal quality of a cell included in the list of information about cells whose frequency is the same as the secondary frequency is better than signal quality of the best cell within a time period; and
   reporting, by the terminal, a message to a network device, to notify the network device that the best cell on the secondary frequency changes;
   wherein obtaining the best cell on the secondary frequency and the list of information comprises setting, by the terminal, a cell on the secondary frequency as the best cell on the secondary frequency, obtaining the information about the best cell on the secondary frequency, and obtaining, by the terminal, the list of the information about the cells whose frequency is the same as the secondary frequency that is sent by the network device; and
   wherein obtaining the list of the information comprises receiving, by the terminal, a Measurement Control message that comprises the list of the information about the cells whose frequency is the same as the secondary frequency and is sent by the network device.

2. The method according to claim 1, wherein setting the cell on the secondary frequency as the best cell on the secondary frequency comprises:
   when there is a secondary serving high speed downlink shared channel cell (secondary serving HS-DSCH cell) that is configured for the terminal on the secondary frequency, setting, the secondary serving HS-DSCH cell as the best cell; and
   when there is no secondary serving HS-DSCH cell that is configured for the terminal, but there is an assisting secondary serving high speed downlink shared channel cell (assisting secondary serving HS-DSCH cell) that is configured for the terminal on the secondary frequency, setting the assisting secondary serving HS-DSCH cell as the best cell.

3. The method according to claim 1, wherein setting the cell on the secondary frequency as the best cell on the secondary frequency comprises:
   when the terminal has an active set, initializing a best cell in the active set to the best cell; and
   when the terminal has no active set, initializing a best cell in a list of information about cells whose frequency is different from the primary frequency or the list of information about the cells whose frequency is the same as the secondary frequency to the best cell.

4. The method according to claim 1, wherein before obtaining the best cell on a secondary frequency and end the list of information, the method further comprises sending, by the terminal to the network device, information about a capability of supporting measurement and reporting the message to the network device.

5. A terminal, comprising:
   a processor, configured to:
      obtain a best cell on a secondary frequency and a list of information about cells whose frequency is the same as the secondary frequency, wherein the terminal works on a primary frequency and the secondary frequency, and the primary frequency is different from the secondary frequency; and determine that a report condition has been met, the report condition comprising information that signal quality of a cell included in the list of information about cells whose frequency is the same as the secondary frequency is better than signal quality of the best cell within a time period;

a transmitter, configured to report a message to a network device to notify the network device that the best cell on the secondary frequency changes;

wherein obtaining the best cell on the secondary frequency and the list of information comprises setting a cell on the secondary frequency as the best cell on the secondary frequency, obtaining information about the best cell on the secondary frequency, and obtaining, by the terminal, the list of the information about the cells whose frequency is the same as the secondary frequency that is sent by the network device; and wherein obtaining the list of the information comprises receiving a Measurement Control message that comprises the list of the information about the cells whose frequency is the same as the secondary frequency and is sent by the network device.

6. The terminal according to claim 5, wherein the processor is configured to:

when there is a secondary serving HS-DSCH cell that is configured for the terminal on the secondary frequency, set the secondary serving HS-DSCH cell as the best cell on the secondary frequency; and when there is no secondary serving HS-DSCH cell that is configured for the terminal, but there is an assisting secondary serving HS-DSCH cell that is configured for the terminal on the secondary frequency, set the assisting secondary serving HS-DSCH cell as the best cell on the secondary frequency.

7. The terminal according to claim 5, wherein that the processor is configured to:

when the terminal has an active set, initialize a best cell in the active set to the best cell; and when the terminal has no active set, initialize a best cell in a list of information about cells whose frequency is different from the primary frequency or the list of the information about the cells whose frequency is the same as the secondary frequency to the best cell.

8. The terminal according to claim 5, wherein the transmitter is further configured to report, to the network device, information about a capability of supporting measurement and reporting the message to the network device.

9. A terminal comprising:
a processor; and
a non-transitory computer-readable storage medium storing a program to be executed by the processor, the program including instructions for:
obtaining a best cell on a secondary frequency and a list of information about cells whose frequency is the same as the secondary frequency, wherein the terminal works on a primary frequency and the secondary frequency, the primary frequency being different from the secondary frequency;
determining that a report condition has been met, wherein the report condition comprises information that signal quality of a cell included in the list of information about cells whose frequency is the same as the secondary frequency is better than signal quality of the best cell within a time period; and
reporting a message to a network device, to notify the network device that the best cell on the secondary frequency changes;
wherein obtaining the best cell on the secondary frequency and the list of information comprises setting, by the terminal, a cell on the secondary frequency as the best cell on the secondary frequency, obtaining the information about the best cell on the secondary frequency, and obtaining, by the terminal, the list of the information about the cells whose frequency is the same as the secondary frequency that is sent by the network device; and
wherein obtaining the list of the information comprises receiving, by the terminal, a Measurement Control message that comprises the list of the information about the cells whose frequency is the same as the secondary frequency and is sent by the network device.

10. The terminal according to claim 9, wherein setting the cell on the secondary frequency as the best cell on the secondary frequency comprises:
when there is a secondary serving high speed downlink shared channel cell (secondary serving HS-DSCH cell) that is configured for the terminal on the secondary frequency, setting the secondary serving HS-DSCH cell as the best cell; and
when there is no secondary serving HS-DSCH cell that is configured for the terminal, but there is an assisting secondary serving high speed downlink shared channel cell (assisting secondary serving HS-DSCH cell) that is configured for the terminal on the secondary frequency, setting the assisting secondary serving HS-DSCH cell as the best cell.

11. The terminal according to claim 9, wherein the program includes further instructions for, before obtaining the best cell on the secondary frequency and the list of information, sending to the network device, information about a capability of supporting measurement and reporting the message to the network device.

* * * * *